(12) United States Patent
Kutz et al.

(10) Patent No.: US 9,098,641 B1
(45) Date of Patent: Aug. 4, 2015

(54) CONFIGURABLE BUS

(75) Inventors: Harold Kutz, Edmonds, WA (US);
Warren S. Snyder, Snohomish, WA (US); Timothy J. Williams, Bellevue, WA (US); Eashwar Thiagarajan, Bothell, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 191 days.

(21) Appl. No.: 11/698,660

(22) Filed: Jan. 25, 2007

Related U.S. Application Data

(60) Provisional application No. 60/763,509, filed on Jan. 30, 2006.

(51) Int. Cl.
*G06F 13/00* (2006.01)
*G06F 13/40* (2006.01)
*G06F 15/173* (2006.01)

(52) U.S. Cl.
CPC ...... *G06F 13/4022* (2013.01); *G06F 15/17375* (2013.01)

(58) Field of Classification Search
CPC .......... G06F 13/4022; G06F 15/17375; G06F 13/1657; G06F 15/7867; H04L 49/101
USPC .................. 710/317, 306–315, 316
See application file for complete search history.

(56) References Cited

U.S. PATENT DOCUMENTS

| | | | |
|---|---|---|---|
| 4,807,183 A * | 2/1989 | Kung et al. .................. 710/317 |
| 5,107,146 A | 4/1992 | El-Ayat | |
| 5,189,665 A * | 2/1993 | Niehaus et al. ............... 370/248 |
| 5,331,315 A * | 7/1994 | Crosette .................... 340/825.02 |
| 5,377,333 A * | 12/1994 | Nakagoshi et al. ........... 710/317 |
| 5,390,173 A * | 2/1995 | Spinney et al. ................ 370/393 |
| 5,530,813 A * | 6/1996 | Paulsen et al. ............... 710/317 |
| 5,666,480 A * | 9/1997 | Leung et al. ..................... 714/1 |
| 5,734,334 A | 3/1998 | Hsieh et al. | |
| 5,812,478 A * | 9/1998 | Okamura ................. 365/230.03 |
| 5,857,109 A | 1/1999 | Taylor | |
| 5,935,233 A * | 8/1999 | Jeddeloh ....................... 710/306 |
| 6,011,751 A * | 1/2000 | Hirabayashi .................. 365/236 |
| 6,070,003 A * | 5/2000 | Gove et al. .................... 710/317 |
| 6,298,040 B1 * | 10/2001 | Aoyagi et al. ................. 370/219 |
| 6,467,011 B2 * | 10/2002 | Scardamalia et al. ........ 710/305 |
| 6,490,213 B1 * | 12/2002 | Mu et al. ....................... 365/208 |
| 6,597,824 B2 | 7/2003 | Newberg et al. | |
| 6,683,392 B2 * | 1/2004 | Reinhardt et al. ............ 307/113 |
| 6,715,023 B1 * | 3/2004 | Abu-Lebdeh et al. ........ 710/317 |
| 6,871,253 B2 * | 3/2005 | Greeff et al. .................. 710/316 |

(Continued)

FOREIGN PATENT DOCUMENTS

| | | | | |
|---|---|---|---|---|
| JP | 05204773 A * | 8/1993 | .............. | G06F 12/16 |
| JP | 2009217581 A * | 9/2009 | .............. | G06F 13/00 |

OTHER PUBLICATIONS

Microsoft Computer Dictionary, defintion of "multiplexer", May 1, 2002, Microsoft Press, Fifth Edition, p. 446.*

(Continued)

*Primary Examiner* — Faisal M Zaman

(57) ABSTRACT

A configurable bus includes a plurality of bus segments. The configurable bus also includes two or more pluralities of input/output (I/O) ports. Each bus segment is coupled to at least one of the pluralities of I/O ports. Also coupled to the bus segments is a cross-couple unit that is configurable to selectively couple any of the bus segments together.

20 Claims, 8 Drawing Sheets

(56) References Cited

U.S. PATENT DOCUMENTS

| | | | |
|---|---|---|---|
| 6,981,090 B1* | 12/2005 | Kutz et al. | 710/317 |
| 6,993,621 B1* | 1/2006 | Black et al. | 710/317 |
| 7,161,936 B1 | 1/2007 | Barrass et al. | |
| 7,162,654 B1* | 1/2007 | Price | 713/320 |
| 2002/0095549 A1* | 7/2002 | Matsunami et al. | 711/114 |
| 2003/0106010 A1* | 6/2003 | Fujioka et al. | 714/763 |
| 2003/0193936 A1* | 10/2003 | Wolrich et al. | 370/360 |
| 2004/0030859 A1* | 2/2004 | Doerr et al. | 712/15 |
| 2006/0143357 A1* | 6/2006 | Shaw et al. | 710/317 |
| 2007/0170931 A1* | 7/2007 | Snyder | 324/658 |
| 2008/0298262 A1* | 12/2008 | Yang et al. | 370/251 |

OTHER PUBLICATIONS

"NB9008292: Self-Contained Dynamic Switch With Extension Capability to Large Switches", Aug. 1, 1990, IBM, IBM Technical Disclosure Bulletin, vol. 33, Iss. 3B, pp. 292-294.*

* cited by examiner

CONFIGURABLE BUS

CROSS-REFERENCE TO RELATED APPLICATION

This application claims the benefit of U.S. Provisional Application No. 60/763,509, filed Jan. 30, 2006, hereby incorporated by reference.

TECHNICAL FIELD

This disclosure relates generally to electronic buses, and in particular but not exclusively, relates to configurable electronic buses.

BACKGROUND INFORMATION

Conventional multiplexers are typically limited to an N to 1 configuration. That is, each input to the multiplexer is a point-to-point interconnect. Such a static configuration provides limited routing options and is not very flexible.

FIG. 1A is a functional block diagram illustrating a prior art multiplexer 102. Multiplexer 102 includes an output 106 and inputs 104a and 104b. FIG. 1B is a circuit diagram illustrating multiplexer 102. As is shown in FIG. 1B, multiplexer 102 basically comprises a switch 108 having two states. The first state is to couple input 104a to output 106. The second state is to couple input 104b to output 106. Multiplexer 102 essentially operates as an N to 1 multiplexer, where N is the number of inputs (e.g. 2 as in multiplexer 102) and "1" is the number of outputs 106.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a configurable bus are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
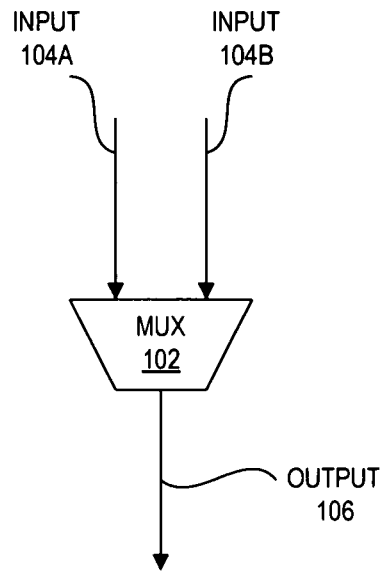
FIG. 1A is a functional block diagram illustrating a prior art multiplexer.
Figure 1B:
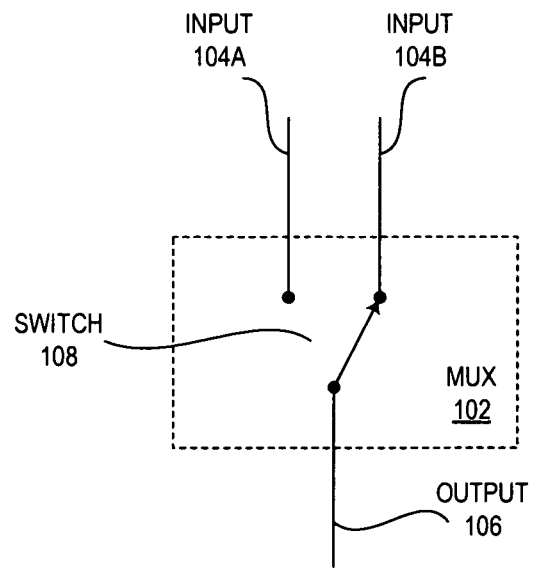
FIG. 1B is a circuit diagram illustrating a prior art multiplexer.
Figure 2:
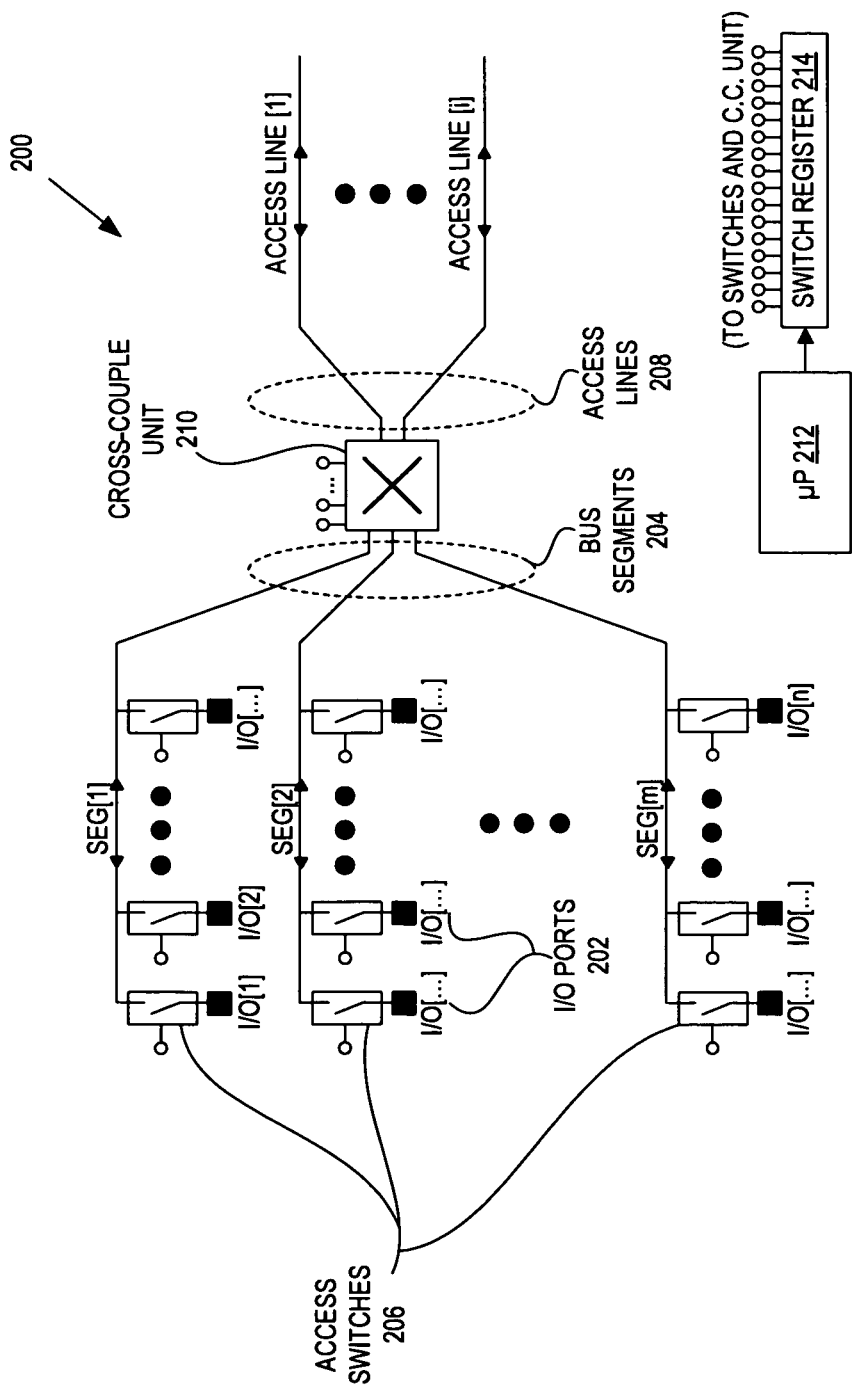
FIG. 2 is a functional block diagram illustrating a configurable bus, in accordance with an embodiment of the invention.

FIG. 2 is a functional block diagram illustrating a configurable bus 200, in accordance with an embodiment of the invention. The illustrated embodiment of configurable bus 200 includes input/output (I/O) ports 202, bus segments 204, access switches 206, access lines 208, a cross-couple unit 210, a microprocessor 212, and a switch register 214.

In the illustrated embodiment, I/O ports 202 are coupled to bus segments 204 via access switches 206. In one embodiment, some or all of I/O ports 202 are coupled directly to bus segments 204 without access switches 206. I/O ports 202 represent a point of access onto configurable bus 200 and may include a printed circuit board pad, a metal electrode, a wire, a pin, a lead, an integrated circuit leg, a trace, a package ball, or any other conductive path for connecting to configurable bus 200.

In the illustrated embodiment, access switch 206 is coupled between I/O port 202 and bus segment 204 to couple and decouple I/O port 202 to and from bus segment 204. In one embodiment, access switches 206 are configured to allow selective enablement of access switches 206. That is, an individual access switch 206 can be closed while the remaining access switches 206 are open. In one embodiment, one or more access switches 206 can be closed while the remaining access switches 206 are open. In one embodiment, any combination of access switches 206 can be closed and opened at the same time.

The illustrated embodiment of configurable bus 200 includes n number of I/O ports 202 coupled to m number of bus segments 204. In one embodiment, each bus segment 204 is coupled to at least one plurality of I/O ports 202. In one embodiment, bus segment 204 is coupled to one or more I/O ports 202.

Bus segments 204 are coupled to cross-couple unit 210. Cross-couple unit 210 is configurable to selectively couple any of bus segments 204 together. In one embodiment, cross-couple unit 210 can be configured to couple one bus segment 204 to another bus segment 204. In one embodiment, cross-couple unit 210 can be configured to couple two or more bus segments 204 together while decoupling one or more other bus segments 204. In one embodiment, cross-couple unit 210 can be configured to couple two or more bus segments 204 together while separately coupling two or more other bus segments 204 together.

In the illustrated embodiment cross-couple unit 210 and access switches 206 are controlled by switch register 214. In one embodiment, switch register 214 includes a multi-bit control register coupled to microprocessor 212. In one embodiment, switch register 214 includes a static or dynamic shift register having logic elements such as, gates, flip-flops, and the like. By selectively setting switch register 214, microprocessor 212 can independently control each of access switches 206 and the configuration of cross-couple unit 210.

Access lines 208 are also coupled to cross-couple unit 210. In the illustrated embodiment, configurable bus 200 includes an i number of access lines 208. In one embodiment, configurable bus 200 includes one access line 208 for every bus segment 204. In one embodiment, configurable bus 200 includes more or less access lines 208 than there are bus segments 204.

In one embodiment, microprocessor 212 can be programmed to control switch register 214 to multiplex all or a portion of I/O ports 202 onto one or more of access lines 208. For example, microprocessor 212 can set switch register 214 to multiplex n I/O ports 202 to i access lines 208. Microprocessor 212 can also set switch register 214 to reconfigure cross-couple unit 210 to multiplex n I/O ports 202 to any number of access lines 208. By way of another example, some of I/O ports 202 can be multiplexed to one or more access lines 208, while other I/O ports 202 can be simultaneously multiplexed to different access lines 208.

In one embodiment, configurable bus 200 can act to selectively interconnect various devices that are coupled to configurable bus 200. In one embodiment, two or more access switches 206, coupled to the same bus segment 204, can be closed to connect two or more I/O ports 202 together. In one embodiment, I/O ports 202 from different bus segments 204 are coupled together by selectively closing access switches 206 and configuring cross-couple unit 210 to couple two or more bus segments 204 together.

In one embodiment, bus segments 204, access switches 206, cross-couple unit 210 and access lines 208 are capable of conducting analog signals (e.g., continuously variable signals as opposed to discretely variable signals).

Figure 3:
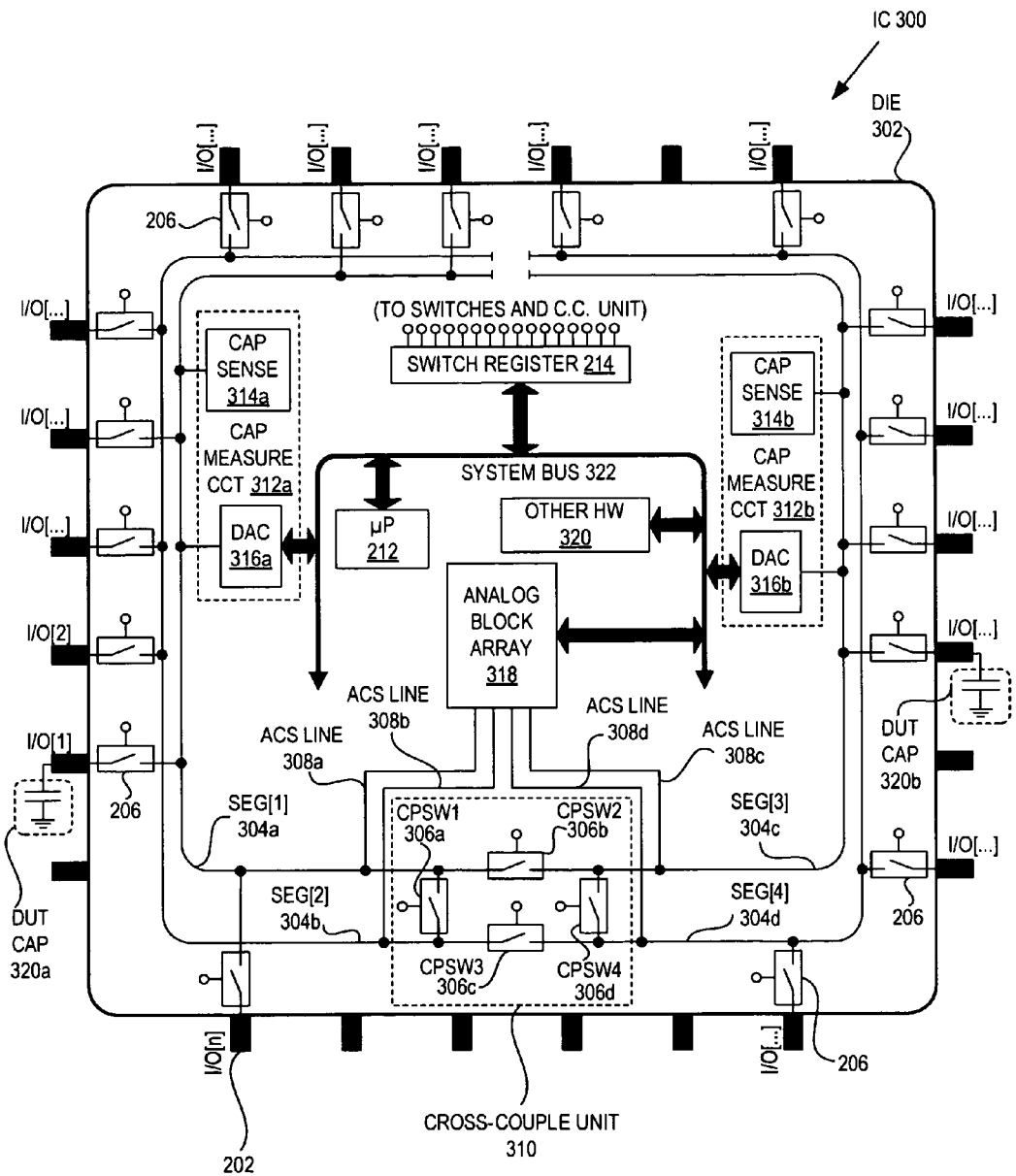
FIG. 3 is a functional diagram illustrating an integrated circuit with a configurable bus, in accordance with an embodiment of the invention.

FIG. 3 is a circuit diagram illustrating an integrated circuit 300 with a configurable bus, in accordance with an embodiment of the invention. In one embodiment, integrated circuit (IC) 300 represents one possible implementation of configurable bus 200. The illustrated embodiment of IC 300 includes I/O ports 202, access switches 206, microprocessor 212, switch register 214, a die 302, bus segments 304a-d, access lines 308a-d, cross-couple unit 310, capacitance measurement circuits 312a and 312b, an analog block array 318, other hardware 320 and a system bus 322. The illustrated embodiments of capacitance measurement circuits 312a and 312b include capacitance sense circuits 314a and 314b, respectively and digital to analog converters (DAC) 316a and 316b, respectively. The illustrated embodiment of cross-couple unit 310 includes cross-point switches (CPSW) 306a-d.

In one embodiment, IC 300 is fabricated on a wafer of electronic-grade silicon (EGS) through known processes, such as lithography. IC 300 is then removed from the wafer to form die 302. Die 302 may be incorporated into any known IC package type including, but not limited to, dual in-line packages (DIP), pin grid arrays (PGA), leadless chip carriers (LLC), surface mount packages (e.g., small-outline integrated circuit), plastic leaded/leadless chip carrier packages (PLCC), plastic quad flat packs (PQFP), ball grid arrays (BGA), and the like. In addition, die 302 may be combined with other dies to form a system in package (SIP) or a multi-chip module (MCM).

IC 300 includes a plurality of I/O ports 202 coupled to at least one of bus segments 304a-d via access switches 206. Although FIG. 3 illustrates a plurality of I/O ports 202 coupled to each of bus segments 304a-d, it is recognized that one or more I/O ports 202 may be coupled to each of bus segments 304a-d. For example, bus segment[1] 304a can be coupled to one I/O port 202, while bus segment 304b can be coupled to two or more I/O ports 202. Also, although FIG. 3 illustrates 17 total I/O ports 202, it is recognized that any total number of I/O ports 202 may be coupled to bus segments 304a-d. In addition, IC 300, in one embodiment, can include I/O ports 202 that are not coupled to any of bus segments 304a-d.

In the illustrated embodiment, IC 300 includes analog block array 318 coupled to bus segments 304a-d via access (ACS) lines 308a-d. Analog block array 318 may include a plurality of user modules (UMs) that are configurable to create a variety of analog signal flows. For example, analog block array can be configured to implement a variety of analog circuits such as, analog-to-digital converters, analog filters, buffers, instrumentation amplifiers, comparators, current output drivers, reference voltages, modulators, correlators, peak detectors, etc. Although FIG. 3 illustrates four access lines 308a-d and four bus segments 304a-d, IC 300 can be fabricated with any number of access lines and bus segments.

In the illustrated embodiment, cross-couple unit 310 is coupled to bus segments 304a-d and includes four cross-point switches (CPSW) 306a-d. CPSW1 306a is coupled between bus segment[1] 304a and bus segment[2] 304b. CPSW2 306b coupled between bus segment[1] 304a and bus segment[3] 304c. CPSW3 306c is coupled between bus segment[2] 304b and bus segment[4] 304d. CPSW4 304d is coupled between bus segment[3] 304c and bus segment[4] 304d. Although FIG. 3 illustrates four cross-point switches 306a-d, cross-couple unit 310 may include more or less cross-point switches dependent, in part, on the number of bus segments.

Each of cross-point switches 306a-d and access switches 206 are coupled to switch register 214 to allow independent control of each switch. That is, each access switch 206 can be closed or opened independently of the other access switches 206 and each cross-point switch 306a-d can be closed or opened independently of the other cross-point switches 306a-d.

In the illustrated embodiment, switch register 214 is controlled by microprocessor 212 via system bus 322. In one embodiment, microprocessor 212 communicates with switch register 214 via memory-mapped I/O (MMIO). In one embodiment microprocessor 212 communicates with switch register 214 via port-mapped I/O (PMIO).

In one embodiment, microprocessor 212 can be programmed to control switch register 214 to multiplex all or a portion of I/O ports 202 onto one or more of access lines 308a-d. For example, microprocessor 212 can set switch register 214 to open all of cross-point switches 306a-d and selectively control access switches 206 to multiplex the I/O ports on bus segment[1] to access line[1]; those on bus segment[2] to access line[2], etc. Microprocessor 212 can also set switch register 214 to reconfigure cross-couple unit 210 to multiplex n I/O ports 202 to any number access lines 308a-d. By way of another example, microprocessor 212 can set switch register 214 to close CPSW2 306b and CPSW3 306c while leaving CPSW1 306a and CPSW4 306d open. Such a configuration couples bus segment[1] to bus segment[3] and bus segment [2] to bus segment[4]. This configuration also effectively couples access line 308a to access line 308c and access line 308b to access line 308d, thereby creating two effective access lines coupled to analog block array 318. Thus, access switches can be selectively controlled to multiplex n I/O ports to the two effective access lines. By configuring cross-point switches 306a-d and selectively enabling access switches 206, the illustrated embodiment of IC 300 can be controlled to multiplex n I/O ports to one, two, three, or four access lines.

In one embodiment, IC 300 can be configured to selectively interconnect various devices that are coupled to any of I/O ports 202. In one embodiment, two or more access switches 206 coupled to the same bus segment 304a-d, can be closed to connect two or more I/O ports 202 together. By way of example, I/O port[1] and I/O port[n] are both coupled to bus segment[1] and can be coupled together by closing their respective access switches. In one embodiment, I/O ports 202 from different bus segments 304a-d can be coupled together by selectively closing access switches 206 and configuring cross-couple unit 310 to couple two or more bus segments 304a-d together. For example, I/O port[1] (coupled to bus segment [1]) and I/O port[2] (coupled to bus segment [2]) can be coupled together by closing CPSW1 306a and by closing their respective access switches 206.

The illustrated embodiment of IC 300 includes capacitance measurement circuit 312a coupled to bus segment[1] 304a and capacitance measurement circuit 312b coupled to bus segment[3] 304c. In one embodiment capacitance measurement circuits 312a and 312b are used to sense changes in capacitance on device under test ("DUT") capacitors 320a and 320b, each having a changing capacitance. In one embodiment, DACs 316a and 316b are set by microprocessor 212 via system bus 322 to output a particular current onto one or more bus segments 304a-d. Although FIG. 3 only illustrates two capacitance measurement circuits 312a and 312b, IC 300 can include one or more capacitance measurement circuits coupled to one or more bus segments 304a-d.

In one embodiment bus segments 304a-d are routed on a periphery of die 302. Routing bus segments 304a-d on the periphery of die 302 can reduce differences in the resultant noise factors on each I/O port 202 because each signal path has a similar, if not identical path through die 302. In one embodiment, bus segments 304a-d include pairs of bus segments routed substantially in parallel on the periphery of die 302. For example, the illustrated embodiment of IC 300 includes bus segment[1] routed substantially in parallel with bus segment[2] on a left-side periphery of die 302. Also, bus segment[3] is routed substantially in parallel with bus segment[4] on a right-side periphery of die 302. Routing bus segments 304a-d substantially in parallel can increase the signal to noise ratio of the bus segment pair if configured to perform analog functions such as, differential signaling.

Figure 4A:
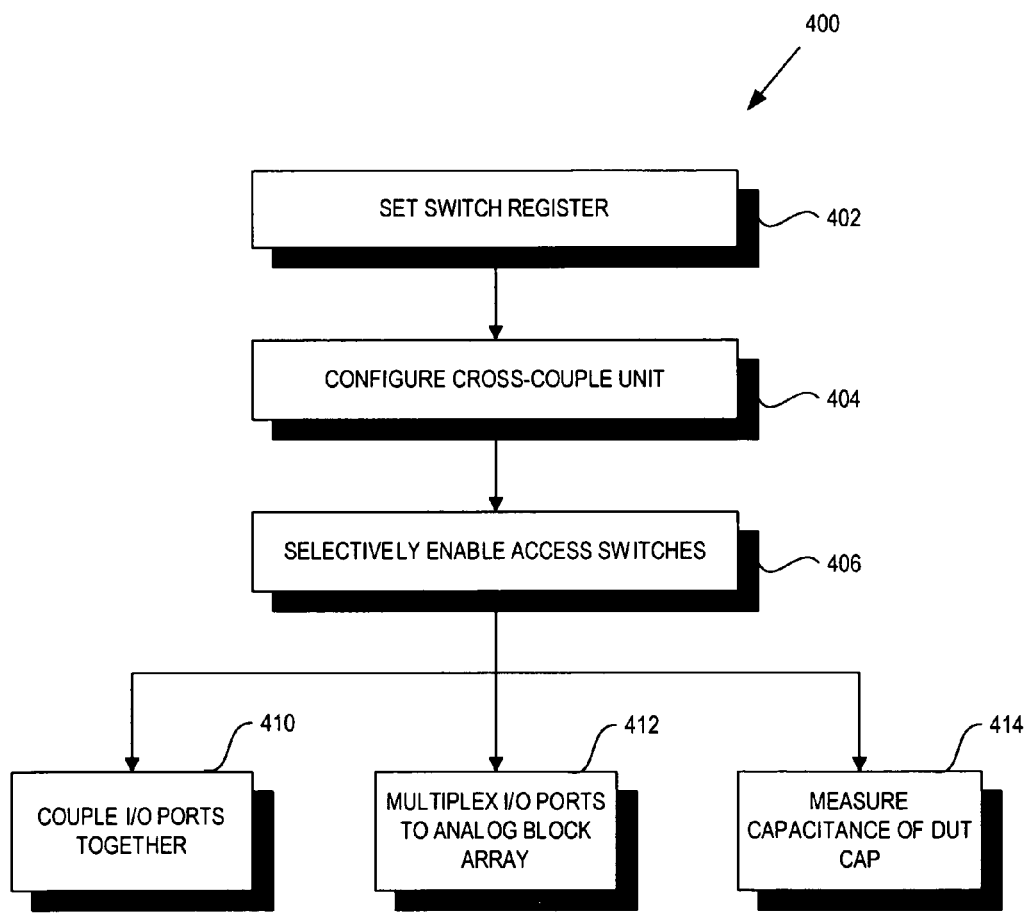
FIG. 4A is a flow chart illustrating a process for configuring a configurable bus, in accordance with an embodiment of the invention.

FIG. 4A is a flow chart illustrating a process 400 for configuring a configurable bus, in accordance with an embodiment of the invention. In one embodiment, process 400 is executed by configurable bus 200. In one embodiment, process 400 is executed by IC 300. Process 400 is described with reference to FIGS. 3, 4A, 4B, and 4C. The order in which some or all of the process blocks appear in process 400 should not be deemed limiting. Rather, one of ordinary skill in the art having the benefit of the present disclosure will understand that some of the process blocks may be executed in a variety of orders not illustrated.

In a process block 402, switch register 214 is set. In one embodiment, switch register 214 is set by microprocessor 212 via system bus 322. In a process block 404, cross-couple unit 310 is configured by switch register 214 to selectively couple any of bus segments 304a-d together. In one embodiment, cross-couple unit 310 is configured by selectively enabling cross-point switches 306a-d. In one embodiment, cross-couple unit can be configured to decouple two or more of bus segments 304a-d while coupling two or more other of bus segments 304a-d. For example, CPSW1 306a can be closed to couple bus segment[1] to bus segment[2] while CPSW2 306b and CPSW4 306d are opened to decouple bus segment [3] from any of the other bus segments 304a-d.

In a process block 406, switch register 214 selectively enables at least one of the access switches 206 to couple I/O port 202 to at least one of bus segments 304a-d. For example, I/O port[1] and DUT capacitor 320a can be coupled to bus segment[1] by closing its respective access switch 206.

Following process block 406, IC 300 can then be configured to execute any of process blocks 410, 412, or 414. In one embodiment, IC 300 executes one of process blocks 410, 412, and 414. In one embodiment, IC 300 simultaneously executes two or more of process blocks 410, 412, and 414. In one embodiment, IC 300 sequentially performs any combination of process blocks 410, 412, and 414.

In process block 410, switch register 214 is configured to interconnect two or more of I/O ports 202. In one embodiment, two or more access switches 206, coupled to the same bus segment 304a-d, are closed to connect two or more I/O ports 202 together. By way of example, two access switches 206, coupled to I/O port[1] and I/O port[n], are closed to couple these two I/O ports together on bus segment[1]. In one embodiment, I/O ports 202 from different bus segments 304a-d are coupled together by selectively closing access switches 206 and configuring cross-couple unit 310 to couple two or more bus segments 304a-d together. By way of another example, I/O port[1] (coupled to bus segment [1]) and I/O port[2] (coupled to bus segment [2]) are coupled together by closing CPSW1 306a and by closing their respective access switches 206.

Figure 4B:
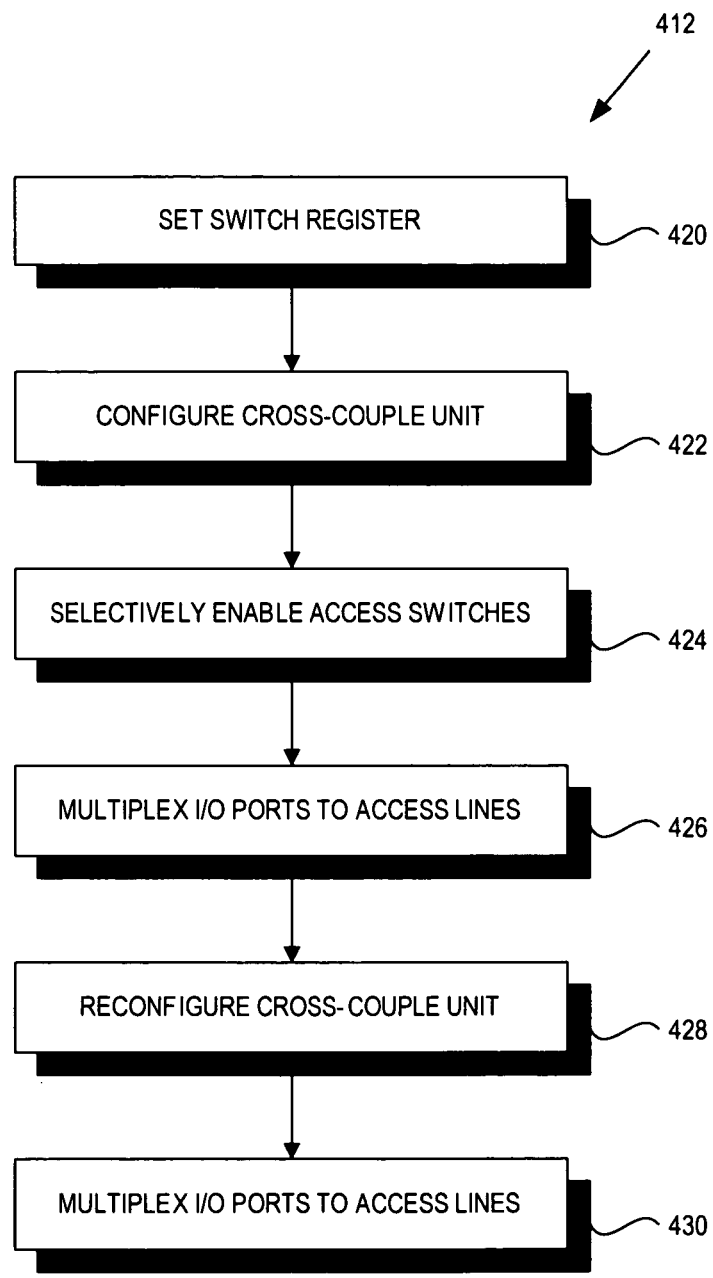
FIG. 4B is a flow chart illustrating a process for multiplexing input/output (I/O) ports coupled to a configurable bus, in accordance with an embodiment of the invention.

In process block 412, I/O ports 202 are multiplexed to analog block array 318 via access lines 308a-d. FIG. 4B is a flow chart illustrating process block 412, in detail, in accordance with an embodiment of the invention.

In a process block 420, switch register 214 is set by microprocessor 212. In response, switch register 214 configures cross-couple unit 310 by selectively enabling cross-point switches 306a-d in a process block 422.

In a process block 424, switch register 214 selectively enables access switches 206 and in block 426 n I/O ports are multiplexed onto any number of access lines 308a-d. In one embodiment, microprocessor 212 is programmed to control switch register 214 to multiplex all or a portion of I/O ports 202 onto one or more of access lines 308a-d. For example, microprocessor 212 can set switch register 214 to open all of cross-point switches 306a-d and selectively control access switches 206 to multiplex the I/O ports on bus segment[1] to access line[1]; those on bus segment[2] to access line[2], etc.

In a process block 428, switch register 214 is set to reconfigure cross-couple unit 310 to multiplex n I/O ports 202 to any number of access lines 308a-d. By way of example microprocessor 212 sets switch register 214 to close CPSW2 306b and CPSW3 306c while leaving CPSW1 306a and CPSW4 306d open. Such a configuration couples bus segment[1] to bus segment[3] and bus segment[2] to bus segment [4]. This configuration also effectively couples access line 308a to access line 308c and access line 308b to access line 308d, thereby creating two effective access lines coupled to analog block array 318. Thus, access switches can be selectively controlled in a process block 430 to multiplex n I/O ports to the two effective access lines. By configuring cross-point switches 306a-d and selectively enabling access switches 206, the illustrated embodiment of IC 300 can be controlled to multiplex n I/O ports to one, two, three, or four access lines. In one embodiment, switch register 214 is configured to multiplex n I/O ports on one access line 308a-d and then multiplex the same n I/O ports on a second access line 308a-d. For example, all or a portion of I/O ports 202 can be multiplexed to access line 308a. Switch register 214 then reconfigures cross-couple unit 310 and selectively controls access switches 206 to multiplex all or a portion of I/O ports to access line 308c.

Figure 4C:
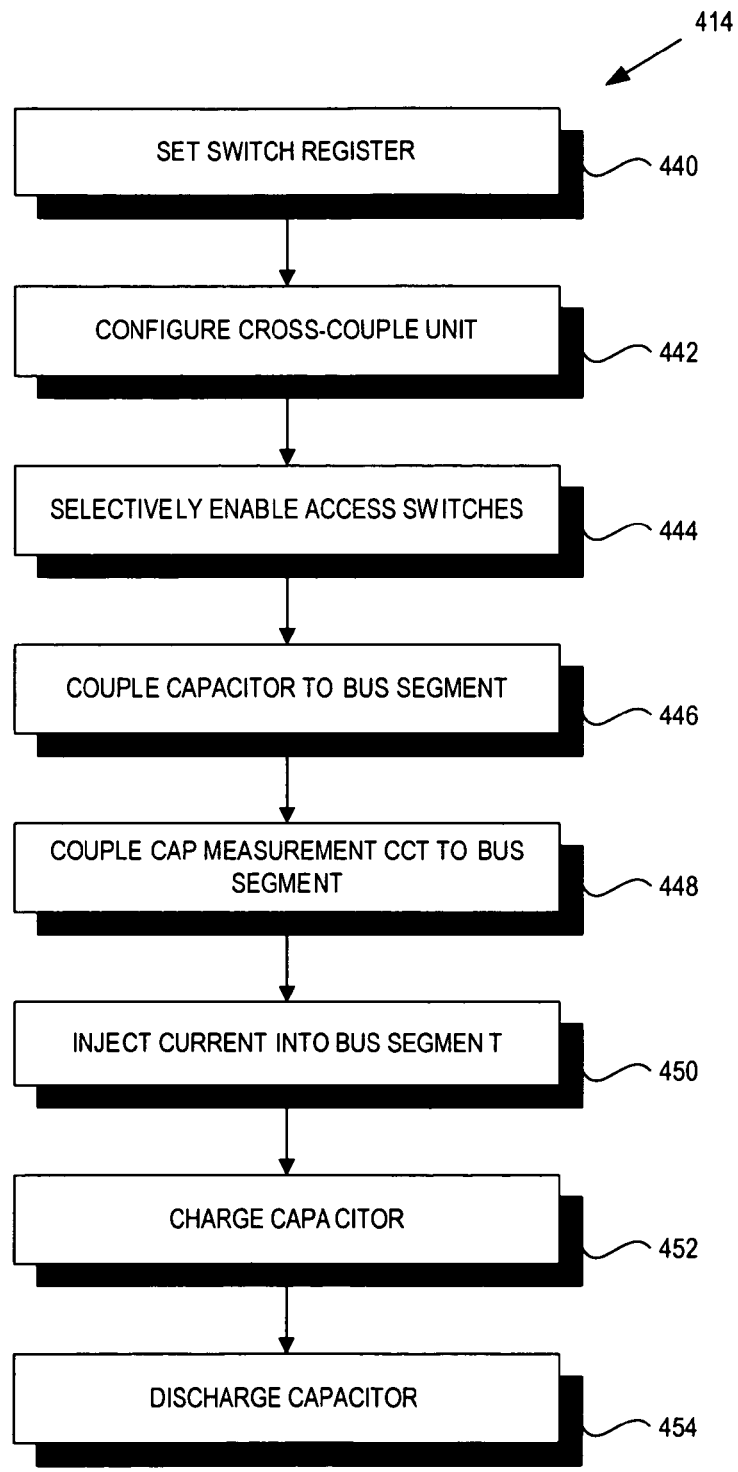
FIG. 4C is a flow chart illustrating a process for measuring the capacitance of a capacitor coupled to an I/O port of a configurable bus, in accordance with an embodiment of the invention.

Referring now back to FIG. 4A, a process block 414 measures the capacitance of DUT capacitors 320a and 320b. FIG. 4C is a flow chart illustrating process block 414, in detail, in accordance with an embodiment of the invention.

In a process block 440, switch register 214 is set by microprocessor 212. In response, switch register 214 configures cross-couple unit 310 by selectively enabling cross-point switches 306a-d in a process block 442.

In a process block 444, switch register 214 selectively enables access switches 206 and in a process block 446, DUT capacitor 320a is coupled to bus segment[1] and DUT capacitor 320b is coupled to bus segment[3]. In a process block 448, switch register 214 configures cross-couple unit 310 to couple capacitance measurement circuits 312a and 312b to the appropriate bus segments 304a-d. For example, DUT capacitor 320a is shown in FIG. 3 as coupled to bus segment[1] and DUT capacitor 320b is shown as coupled to bus segment[3]. In this example, CPSW2 306b is opened to allow for independent measurement of the two DUT capacitors. However, in one embodiment, DUT capacitor 320a can be coupled another of bus segments 304a-b, such as bus segment[2]. If so, CPSW1 is closed to couple capacitance measurement circuit 312a to bus segment[2].

In a process block 450, DACs 316a and 316b are set by microprocessor 212 via system bus 322 to inject a current into their respective bus segments 304a-d. In a process block 452, as current is injected into the bus segments, DUT capacitors 320a and 320b are charged. In a process block 454 capacitor 320a is discharged to capacitance sense circuit 314a and capacitor 320b is discharged to capacitance sense circuit 314b. In one embodiment, capacitance sense circuits 314a and 314b sense a change in capacitance and transmit a trigger to microprocessor 212 indicating a change in capacitance. In one embodiment, capacitance sense circuits 314a and 314b measure the capacitance on DUT capacitors 320a and 320b and generate a signal representative of that capacitance. In one embodiment, the signal is sent either directly or via system bus 322 to microprocessor 212. In one embodiment, capacitance sense circuits 314a and 314b are coupled to analog block array 318 via cross-couple unit 310 to condition or manipulate the signal representing the capacitance of DUT capacitors 320a and 320b.

Figure 5:
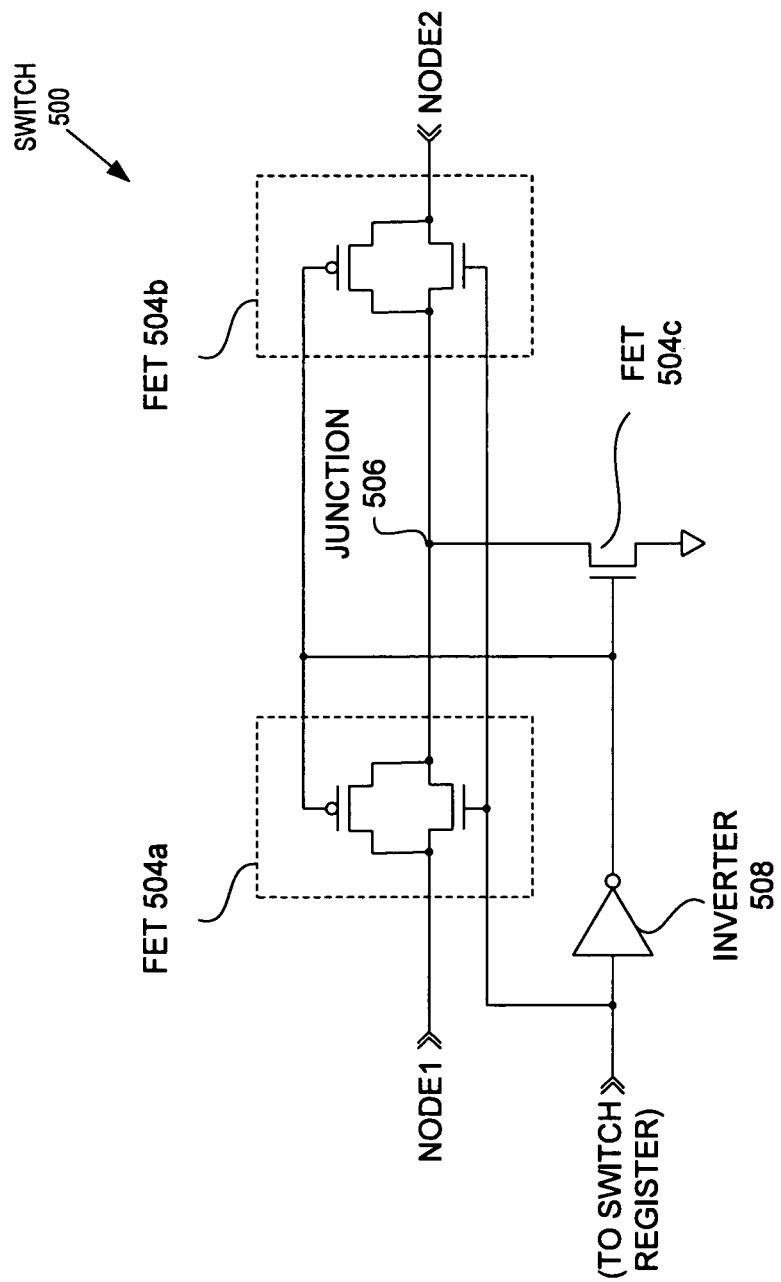
FIG. 5 is a circuit diagram illustrating a switch of a configurable bus, in accordance with an embodiment of the invention.

FIG. 5 is a circuit diagram illustrating a switch 500 of a configurable bus, in accordance with an embodiment of the invention. In one embodiment, switch 500 represents one possible implementation of access switches 206. In one embodiment, switch 500 represents one possible implementation of cross-point switches 306a-d. The illustrated embodiment of switch 500 includes a FET 504a coupled in series with a FET 504b. The illustrated embodiment of switch 500 also includes a FET 504c connected to a junction 506 between FETs 504a and 504b. Also included is inverter 508 coupled at least to a gate of FET 504c.

Although FIG. 5 shows FETs 504a and 504b as complimentary metal oxide field effect transistors (CMOSFETs), FETs 504a and 504b may include any device for selectively coupling NODE1 to NODE2 such as, a metal oxide semiconductor FET (MOSFET), a junction FET (JFET), metal semiconductor FET (MESFET), High Electron Mobility Transistor (HEMT), a heterostructure FET (HFET), a modulation doped FET (MODFET), and the like.

FET 504c is coupled to shunt communication between NODE1 and NODE2, while FETs 504a and 504b are off. In the illustrated embodiment, FET 504c is coupled between junction 506 and a voltage rail (e.g., ground or voltage source). In one embodiment FET 504c is coupled between junction 506 and a quiet signal. In this embodiment, the quiet signal includes a voltage which may or may not be a ground or supply, but has a relatively small amount of interfering noise from other sources (e.g., interferors and thermal). In one embodiment, FET 504c is coupled between junction 506 and a reference voltage. In the illustrated embodiment, Inverter 508 is coupled to enable FET 504c while disabling FETs 504a and 504b. Inverter 508 is also coupled to disable FET 504c while simultaneously enabling FETs 504a and 504b.

In one embodiment, switch 500 is configured to operate as any of access switches 206. In this embodiment, NODE1 is coupled to I/O port 202 and NODE2 is coupled to at least one bus segment 204 or bus segments 304a-d.

In one embodiment, switch 500 is configured to operate as any of cross-point switches 306a-d. In this embodiment, NODE1 and NODE2 are each coupled to at least one of bus segments 304a-d.

Figure 6:
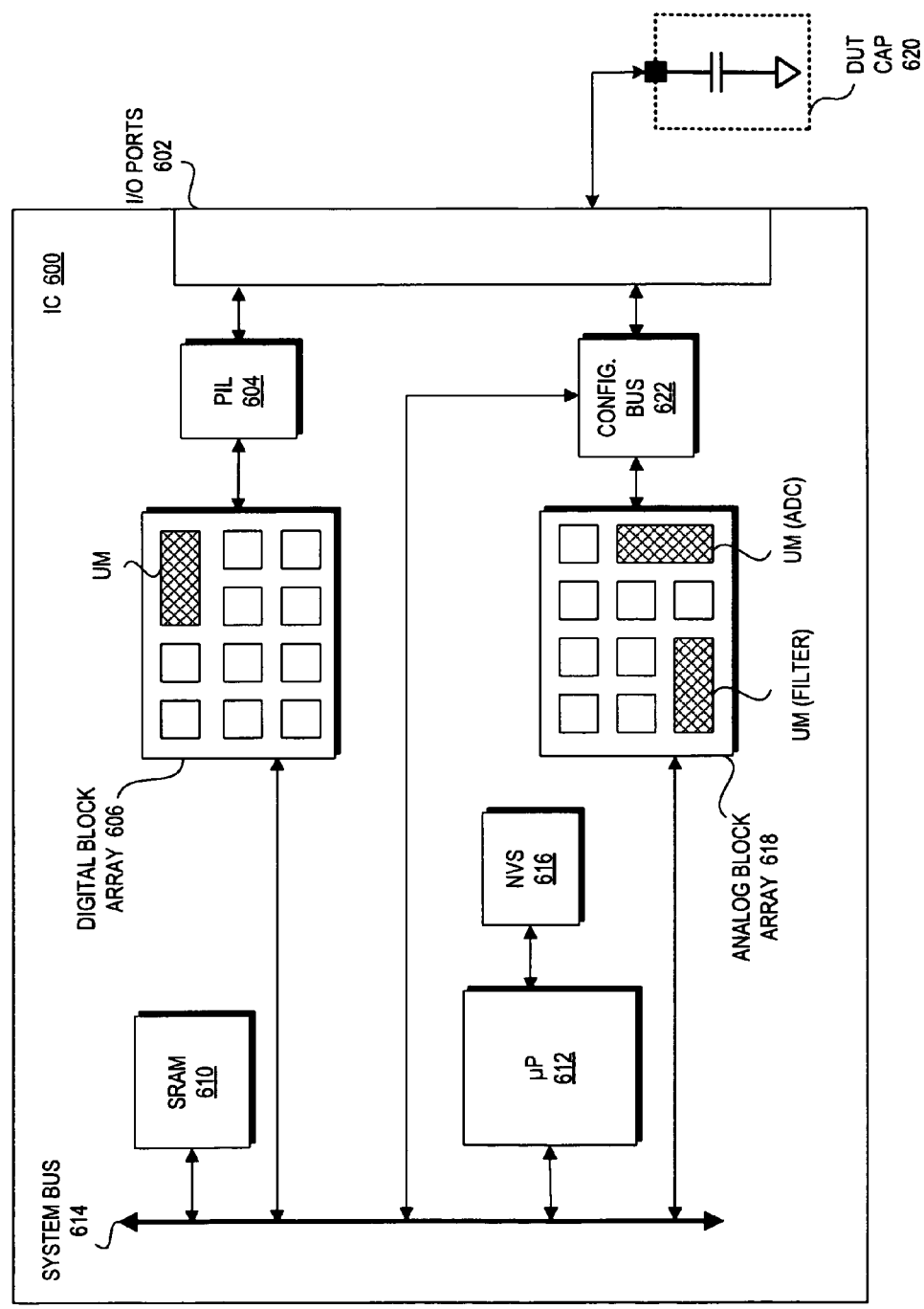
FIG. 6 illustrates a demonstrative integrated circuit for implementing an embodiment of the invention.

FIG. 6 illustrates a demonstrative integrated circuit ("IC") 600 implemented using an embodiment of configurable bus 200 or IC 300. IC 600 may include a Programmable System on a Chip (PSoC™) microcontroller by Cypress Semiconductor Corporation. The illustrated embodiment of IC 600 includes input/output ("I/O") ports 602. I/O ports 602 are coupled to Programmable Interconnect and Logic ("PIL") 604 which acts as an interconnect between I/O ports 602 and a digital block array 606. Digital block array 606 may be configured to implement a variety of digital logic circuits (e.g., DAC, digital filters, digital control systems, etc.) using configurable user modules ("UMs"). Digital block array 606 is further coupled to a system bus 614.

Static Random Access Memory ("SRAM") 610 and microprocessor 612 are also coupled to system bus 614. Microprocessor 612 is coupled to non-volatile storage ("NVS") 616 which may be used to store firmware (e.g., control algorithms executable by microprocessor 212 to implement process 400).

An analog block array 618 is coupled to system bus 614. Analog block array 618 also may be configured to implement a variety of analog circuits (e.g., ADC, analog filters, comparators, current sources, etc.) using configurable UMs. Analog block array 618 is also coupled to a configurable bus 622 which is coupled to I/O ports 602 and system bus 614. Configurable bus 622 may include an embodiment of configurable bus 200, bus segments 304a-d, cross-couple unit 210 or 310, access switches 206, access lines 208 or 308a-d, switch register 214 or capacitance measurement circuits 312a and 312b. As illustrated, configurable bus 622 may also be incorporated into IC 600 for coupling to an externally coupled DUT capacitor 620 via I/O ports 602.

The processes explained above are described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit ("ASIC") or the like. The order in which some or all of the process blocks appear in each process should not be deemed limiting. Rather, one of ordinary skill in the art having the benefit of the present disclosure will understand that some of the process blocks may be executed in a variety of orders not illustrated.

As described above, configurable bus 200 or IC 300 may be incorporated into IC 600, as well as, various other integrated circuits. Descriptions of configurable bus 200 or IC 300 may be generated and compiled for incorporation into other integrated circuits. For example, behavioral level code describing configurable bus 200, or portions thereof, may be generated using a hardware descriptive language, such as VHDL or Verilog, and stored to a machine-accessible medium. Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe configurable bus 200 or IC 300.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A device comprising:
    an analog block array;
    a first analog bus segment coupled to the analog block array;
    a second analog bus segment coupled to the analog block array;
    a third analog bus segment coupled to the analog block array;
    a fourth analog bus segment, coupled to the analog block array;
    a first I/O pin selectively couplable to the first analog bus segment;
    a second I/O pin selectively couplable to the second analog bus segment;
    a third I/O pin selectively couplable to the third analog bus segment;
    a fourth I/O pin selectively couplable to the fourth analog bus segment;
    a first switch configured to selectively propogate a first analog signal on the first analog bus segment to the second analog bus segment;
    a second switch configured to selectively propogate a second analog signal on the first analog bus segment to the third analog bus segment;
    a third switch configured to selectively propogate a third analog signal on the second analog bus segment to the fourth analog bus segment;
    a fourth switch configured to selectively propogate a fourth analog signal on the third analog bus segment to the fourth analog bus segment;
    wherein,
        in a first mode of operation, the first, second, third, and fourth switches are open,
        in a second mode of operation, the first switch is closed, and
        in a third mode of operation, the second switch is closed.
2. The device of claim 1, wherein, in the second mode of operation, the fourth switch is closed.

3. The device of claim 1, wherein, in the third mode of operation, the third switch is closed.
4. The device of claim 1, wherein, in a fourth mode of operation, the first and second switches are closed.
5. The device of claim 1, wherein, in a fifth mode of operation, the first, second, and third switches are closed.
6. The device of claim 1 further comprising a microprocessor configured to control operation of the first, second, third, and fourth switches.
7. The device of claim 6, wherein the microprocessor is further configured to control the coupling of the first, second, third and fourth I/O pins to the first, second, third, and fourth analog bus segments, respectively.
8. The device of claim 7, wherein the first, second, third, and fourth I/O pins are coupled to each other through the first, second, third, and fourth analog bus segments and at least three of the first, second, third, and fourth switches.
9. The device of claim 1, wherein, in the first operating mode, the first I/O pin is coupled to a first analog function of the analog block array via the first analog bus segment and the second I/O pin is coupled to a second analog function of the analog block array via the second analog bus segment.
10. The device of claim 9, wherein, in the second operating mode, the first and second I/O pins are coupled to the first analog function via the first and second analog bus segments and the first switch.
11. A method comprising:
    in a first mode of operation, opening a first switch, a second switch, a third switch, and a fourth switch, wherein:
        the first switch is configured to selectively propogate a first analog signal on a first analog bus segment to a second analog bus segment, the first analog bus segment coupled to an analog block array and selectively coupleable to a first I/O pin and the second analog bus segment coupled to the analog block array and selectively coupleable to a second I/O pin,
        the second switch configured to selectively propogate a second analog signal on the first analog bus segment to a third analog bus segment, the third analog bus segment coupled to the analog block array and selectively coupleable to a third I/O pin,
        the third switch configured to selectively propogate a third analog signal on the second analog bus segment to a fourth analog bus segment, the fourth analog bus segment coupled to the analog block array and selectively coupleable to a fourth I/O pin, and
        the fourth switch configured to selectively propogate a fourth analog signal on the third analog bus segment to the fourth analog bus segment;
    in a second mode of operation, closing the first switch; and
    in a third mode of operation, closing the second switch.
12. The method of claim 11, wherein, in the second mode of operation, the fourth switch is closed.
13. The method of claim 11, wherein, in the third mode of operation, the third switch is closed.
14. The method of claim 11, wherein, in a fourth mode of operation, the first and second switches are closed.
15. The method of claim 11, wherein, in a fifth mode of operation, the first, second, and third switches are closed.
16. The method of claim 11, wherein the operation of the first, second, third, and fourth switches is controlled by a microcontroller.
17. The method of claim 16, wherein the microprocessor is configured to control the coupling of the first, second, third and fourth I/O pins to the first, second, third, and fourth analog bus segments, respectively.

18. The method of claim 17, wherein the first, second, third, and fourth I/O pins are coupled to each other through the first, second, third, and fourth analog bus segments and at least three of the first, second, third, and fourth switches.

19. The method of claim 11, wherein, in the first operating mode, the first I/O pin is coupled to a first analog function of the analog block array via the first analog bus segment and the second I/O pin is coupled to a second analog function of the analog block array via the second analog bus segment.

20. The method of claim 19, wherein, in the second operating mode, the first and second I/O pins are coupled to the first analog function via the first and second analog bus segments and the first switch.

\* \* \* \* \*